US007842107B2

(12) United States Patent
Hogsett et al.

(10) Patent No.: US 7,842,107 B2
(45) Date of Patent: Nov. 30, 2010

(54) METHOD AND APPARATUS FOR THERMALLY UPGRADING CARBONACEOUS MATERIALS

(75) Inventors: Robert F. Hogsett, Lakewood, CO (US);
Philippus J. Meyer, Secunda (ZA);
Michael F. Ray, Canyon Lake, TX (US);
Michael L. Schlegel, Story, WY (US);
Sheldon L. Schultz, Boise, ID (US)

(73) Assignee: Evergreen Energy Inc., Denver, CO (US)

( * ) Notice: Subject to any disclaimer, the term of this patent is extended or adjusted under 35 U.S.C. 154(b) by 1161 days.

(21) Appl. No.: 11/486,349

(22) Filed: Jul. 13, 2006

(65) Prior Publication Data

US 2006/0248791 A1 Nov. 9, 2006

Related U.S. Application Data

(63) Continuation of application No. 10/837,998, filed on May 3, 2004, now Pat. No. 7,198,655.

(51) Int. Cl.
*C10L 5/00* (2006.01)
(52) U.S. Cl. .................. 44/629; 422/200; 422/201; 422/307; 165/110
(58) Field of Classification Search .......... 44/621, 44/629; 422/200, 201, 307; 165/110
See application file for complete search history.

(56) References Cited

U.S. PATENT DOCUMENTS

| 4,810,258 | A | 3/1989 | Greene |
| 5,071,447 | A | 12/1991 | Koppelman |
| 5,290,523 | A | 3/1994 | Koppelman |
| 5,769,908 | A * | 6/1998 | Koppelman .......... 44/621 |
| 6,185,841 | B1 | 2/2001 | Conochie |
| 6,249,989 | B1 | 6/2001 | Conochie et al. |
| 6,266,894 | B1 | 7/2001 | Conochie |
| 6,497,054 | B2 | 12/2002 | Davies et al. |
| 6,497,737 | B1 | 12/2002 | Conochie et al. |
| 6,506,224 | B1 | 1/2003 | Conochie |

(Continued)

FOREIGN PATENT DOCUMENTS

JP 53-112903 10/1978

(Continued)

OTHER PUBLICATIONS

Supplementary European Search Report dated Aug. 24, 2009, issued in European Patent Application No. EP 05 72 5152.2, filed Mar. 11, 2005.

(Continued)

*Primary Examiner*—Cephia D Toomer
(74) *Attorney, Agent, or Firm*—Harness, Dickey & Pierce, P.L.C.

(57) ABSTRACT

Carbonaceous materials are thermally upgraded in a pressurized steam environment to remove moisture and other byproducts. A variety of water/solid separation devices may be employed in a process vessel to maximize moisture removal from the upgraded charge. Heating media inlet nozzles and process chamber vents are strategically positioned at the process vessel wall to minimize short circuiting of heating media to vessel outlet vents and to continuously separate hot water removed from the charge and condensed steam, such that the upgraded material removed from the process vessel is not discharged with accompanying free moisture. After upgrading, the charge may be rehydrated to improve its stability during shipping and storage.

26 Claims, 6 Drawing Sheets

U.S. PATENT DOCUMENTS

2002/0079273 A1    6/2002    Davies et al.

FOREIGN PATENT DOCUMENTS

| JP | 56-104995 | 8/1981 |
|----|-----------|--------|
| JP | 58-171486 | 10/1983 |
| JP | 63-12918 | 3/1988 |
| JP | 63-54759 | 10/1988 |
| JP | 64-9360 | 2/1989 |
| JP | 5-503954 | 6/1993 |
| JP | 8-504445 | 5/1996 |
| JP | 11-510538 | 9/1999 |
| JP | 2001-518844 | 10/2001 |
| WO | 98/42427 | 10/1994 |

OTHER PUBLICATIONS

Translation of Notification of Reason for Refusal, mailed Jul. 13, 2010, received in corresponding Japanese application No. 2007-511356.

* cited by examiner

FIG - 4C
SECTION B-B

FIG - 4D
SECTION A-A

FIG - 4E
SECTION C-C

FIG-5

METHOD AND APPARATUS FOR THERMALLY UPGRADING CARBONACEOUS MATERIALS

RELATED APPLICATION

This is a continuation of commonly assigned U.S. patent application Ser. No. 10/837,998 filed May 3, 2004, and now issued as U.S. Pat. No. 7,198,655 on Apr. 3, 2007.

BACKGROUND OF THE INVENTION

The invention generally relates to thermal upgrading of carbonaceous materials, such as sub-bituminous rank and lignite rank coals, peat and various forms of bio-mass fuels. More particularly, the invention concerns thermal upgrading of carbonaceous materials by direct contact with a heating medium and by removing moisture from the charge as hot water.

U.S. Pat. No. 5,071,447 to Koppelman discloses methods and apparatus for steam treating carbonaceous materials. Under the system disclosed in the '447 patent, steam is injected at the top of a processing vessel.

U.S. Pat. No. 5,769,908 to Koppelman relates to the treatment of carbonaceous materials by injecting an inert gas into the carbonaceous material under a vacuum or injecting steam into the carbonaceous material either with or without the vacuum being applied in a controlled manner to more consistently treat the charge of carbonaceous material.

While the prior teachings in the two above cited Koppelman patents are believed to have been advances in the art addressing many problems in the area of thermal upgrading of materials, such as coal, there remains a need in the art to more consistently insure that all surfaces of the charge of carbonaceous material reach the same final temperature, to minimize free moisture accompanying the upgraded charge, and to accomplish improved removal of unwanted byproducts from the charge.

SUMMARY OF THE INVENTION

Accordingly, apparatus for upgrading energy content of a charge of carbonaceous material includes a process vessel having a chamber for receipt of the charge, a carbonaceous material inlet for transferring the charge to the chamber and a carbonaceous material outlet for transferring an upgraded charge out of the chamber. At least one heating medium inlet adapted to be coupled to a source of heating medium for transferring the heating medium under pressure into the process vessel chamber for direct contact with the charge is positioned on the process vessel. At least one fluid outlet and at least one liquid separator having at least one perforated surface engaging the charge for passing liquid associated with the charge through the perforated surface into a liquid collection chamber coupled to the at least one fluid outlet for passing liquid separated from the charge thereto is additionally provided.

In another aspect of the invention, apparatus for upgrading energy content of a charge of carbonaceous material utilizes a substantially vertically oriented process vessel having a carbonaceous material inlet positioned at a top end of the vessel, a carbonaceous material outlet positioned at a bottom end of the vessel and a chamber for receipt of the charge extending from the carbonaceous material inlet to the carbonaceous material outlet. A plurality of heating medium inlets are adapted to be coupled to a source of heating medium for transferring the heating medium under pressure into the process vessel chamber for direct contact with the charge, the heating medium inlets positioned at preselected locations between the top end and the bottom end of the vessel. A plurality of liquid outlets are positioned at preselected locations between the top end and the bottom end of the vessel. A plurality of process vessel vents are positioned at preselected locations between the top end and the bottom end of the vessel and enable selective discharge of gases from the process vessel chamber. Finally, a plurality of liquid separators are positioned at a plurality of preselected locations within the chamber, each liquid separator having a perforated surface engaging the charge for passing liquid associated with the charge through the perforated surface into a liquid collection chamber coupled to at least one of the plurality of liquid outlets to pass separated liquid to the at least one of the plurality of liquid outlets.

In yet another aspect of the invention, a method for upgrading energy content of a charge of carbonaceous material having a first equilibrium moisture level begins with directly contacting the charge with a heating medium under pressure to heat the charge to drive moisture from the charge to a second moisture level below the first equilibrium moisture level and to lower an equilibrium moisture level of the charge to a value between the first equilibrium moisture level and the second moisture level. Moisture driven from the charge is separated therefrom.

BRIEF DESCRIPTION OF THE DRAWINGS

The objects and features of the invention will become apparent from a reading of a detailed description, taken in conjunction with the drawings, in which:

FIG. 4B is an enlarged view of perforated regions of the separation surfaces of the devices of FIG. 4A;

FIGS. 4C, D and E are top plan views of the vessel of FIG. 4A taken respectively at locations A-A, B-B and C-C of FIG. 4A.

DETAILED DESCRIPTION

Figure 1:
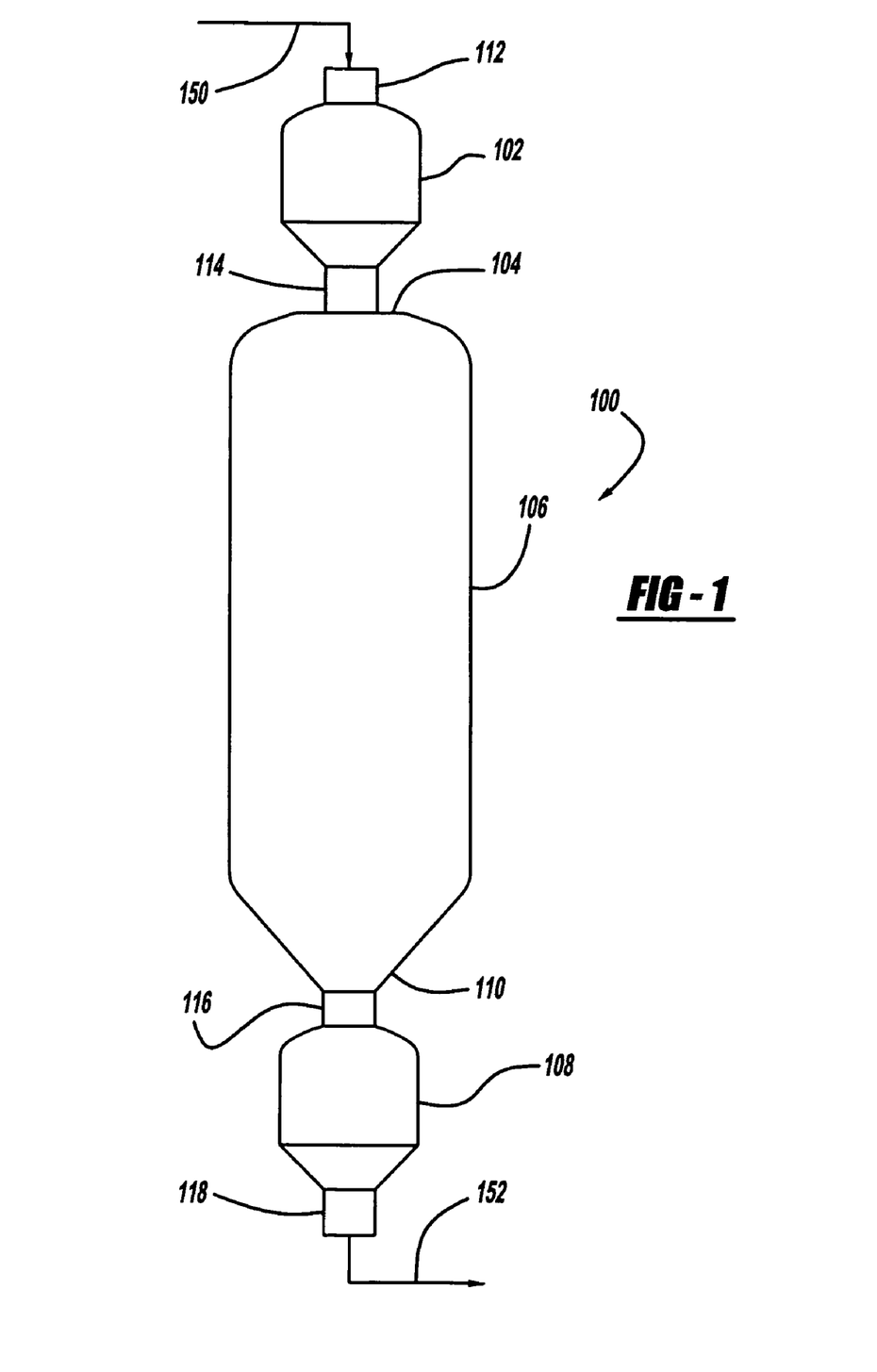
FIG. 1 is a side elevation view showing the vertical orientation of a feed lock hopper on top of the main process vessel with a product discharge lock hopper under the process vessel, in accordance with the principles of the present invention.

Referring to FIG. 1, processing system 100 includes a feed lock hopper 102 positioned at a top portion 104 of a process vessel 106, with a discharge lock hopper 108 positioned below a bottom portion 110 of process vessel 106. At an input of each lock hopper 102 and 108 are valves 112 and 116, respectively, which seal their respective lock hopper from atmospheric pressure up to an operating pressure of process vessel 106. Likewise, there are output valves 114 and 118 at an output of respective lock hoppers 102, 108 which serve the same purpose.

Carbonaceous charge material in conduit 150 is intermittently fed into feed lock hopper 102 via valve 112 being in an open position and bottom valve 114 in a closed position. Input valve 112 is then closed, and lock hopper 102 is brought up to the same operating pressure as in process vessel 106. Valve 114 is then opened, and the charge material flows by gravity into the process vessel 106. When feed lock hopper 102 is empty, output valve 114 is closed, and the pressure in lock hopper 102 is lowered to atmospheric conditions. Input valve 112 is then opened, and the feed lock hopper 102 is ready to start another feed cycle via conduit 150. The hourly feed rate of carbonaceous material, on an average basis, is determined by the weight of material fed each cycle and the number of cycles per hour, and the feed flow into the process vessel 106 is thus intermittent.

With continued reference to FIG. 1, in a manner similar to operation of feed lock hopper 102, discharge lock hopper 108 intermittently removes upgraded charge material from process vessel 106 via conduit 152. The simplified sequence of the cyclic operational steps would be that the empty discharge lock hopper 108 has just discharged upgraded material to atmospheric conditions and to further processing equipment via conduit 152. Output valve 118 is then closed, the pressure is equalized to that of process vessel 106, and output valve 116 is opened. After discharge lock hopper 108 is full, input valve 116 is closed and the pressure in the lock hopper 108 is lowered to atmospheric conditions. Outlet valve 118 is then opened, and output lock hopper 108 intermittently discharges upgraded charge material via conduit 152 to complete the cycle. The lowering of pressure in lock hopper 108 also serves to lower the temperature through evaporation of water from inner portions of the carbonaceous charge.

Process vessel 106 could be operated in a batch mode without using feed or discharge lock hoppers 102 or 108. An input valve 114 and an output valve 116 would be required, and then the sequence of operation would be the same as for one of the lock hoppers previously described—i.e., with the output valve 116 closed and process vessel at atmospheric pressure, feed material flows into process vessel 106 via open input valve 114. Valve 114 is then closed after the process vessel 106 is full, process vessel 106 is brought to operating pressure and temperature and, after a desired processing time, process vessel 106 pressure is lowered to atmospheric, output valve 116 is opened and the upgraded charge is discharged. After process vessel is empty, output valve 116 is closed and the batch cycle starts again. Using multiple batch process vessels, and with the proper sequencing of cycles on each vessel, it is possible to operate batch vessels in a manner that overall feed and discharge to and from the multiple vessels approaches continuous operation.

Figure 2:
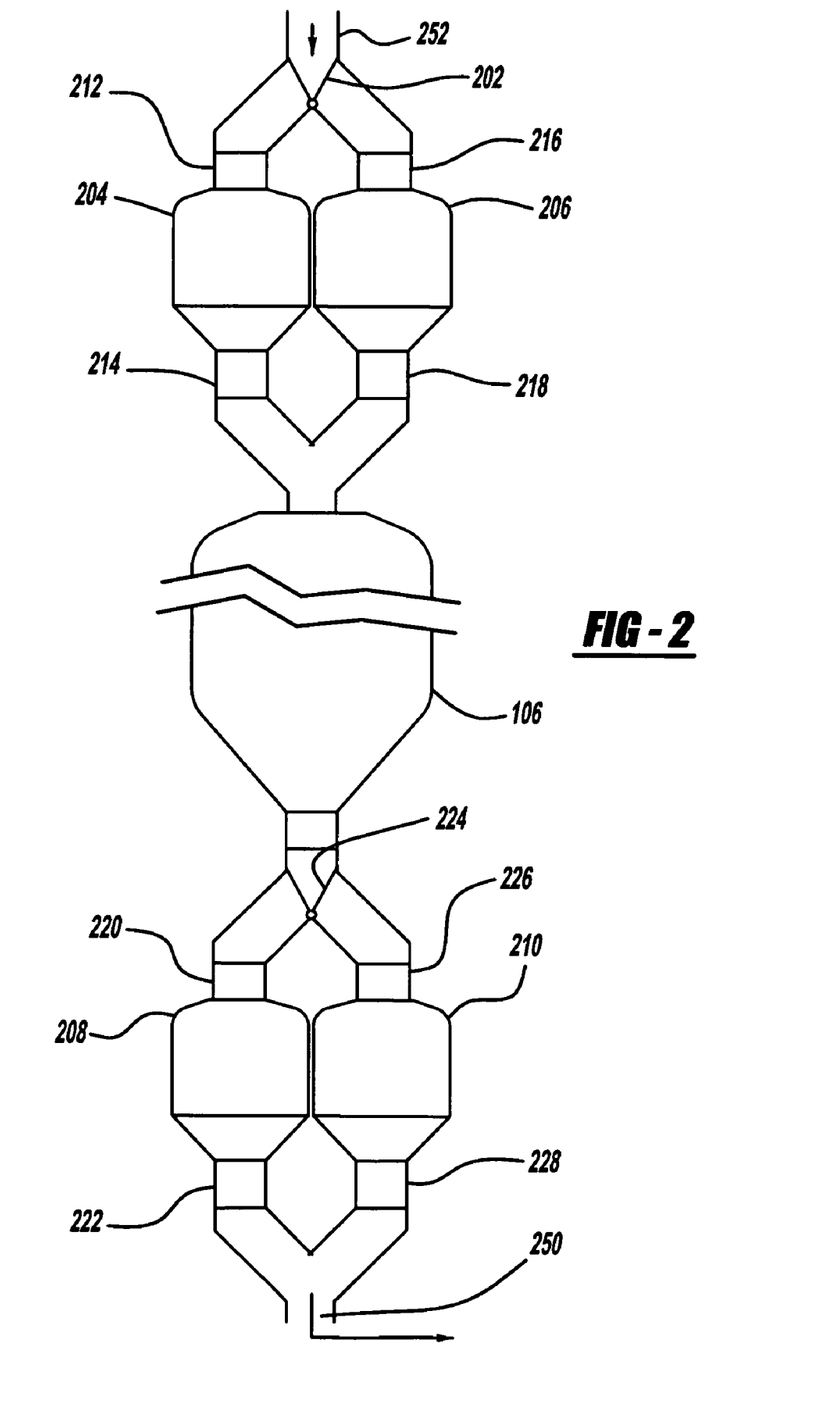
FIG. 2 is a side elevation view showing two feed lock hoppers and two product discharge lock hoppers in combination with the process vessel for providing continuous charge processing in accordance with the principles of the invention.

Using two feed lock hoppers and two discharge lock hoppers, it is possible to achieve true continuous feed and discharge into and out of process vessel 106. FIG. 2 shows an equipment arrangement that would allow such a continuous process. Feed charge material is fed from inlet duct 252 through a diverter valve 202 which directs the feed flow to either of the feed lock hoppers 204 or 206. For continuous feed, one of these lock hoppers is full and ready to feed process vessel 106 before the other hopper is empty. At the discharge end of the vessel, one of the discharge lock hoppers 208, 210 is empty and ready to receive upgraded material before the other discharge lock hopper is full. With this operation the feed into process vessel 106 is continuous, and the discharge out of process vessel 106 is continuous. Hence, process vessel 106 operates in a completely continuous mode. However, because of the requirement that one of the feed lock hoppers is full and waiting to feed and one of the discharge lock hoppers is empty and waiting to receive discharge, the feed into the feed lock hoppers and the discharge out of the discharge lock hoppers will not be continuous, but will approach continuous operation.

With continued reference to FIG. 2 the sequence for continuous operation of process vessel 106 is as follows. Feed lock hopper 204 will be feeding process vessel 106 with input valve 212 in the closed position and output valve 214 in the open position. The other feed lock hopper 206 will be sitting full of feed and will be at process vessel pressure. Additionally, both input valve 216 and output valve 218 will be closed. As soon as feed lock hopper 204 is empty, output valve 214 closes and simultaneously output valve 218 on feed lock hopper 206 opens and feeds into the process vessel 106 in a continuous and uninterrupted manner. The pressure in feed lock hopper 204 is then lowered to atmospheric, input valve 212 is opened, diverter valve 202 is positioned to feed the charge material into feed lock hopper 204, and the feed continues until feed lock hopper 204 is full. The flow of feed charge material is stopped, input valve 212 on feed lock hopper 204 is closed, the pressure in feed lock hopper 204 is equalized to process vessel 106 pressure, and the feed lock hopper 204 then sits and waits for feed lock hopper 206 to empty. The cycle is then ready to repeat.

Still referring to FIG. 2, the sequence for operation of discharge lock hoppers 208 and 210 is the same as for feed lock hoppers 204 and 206 described above, except that one of the discharge lock hoppers 208 (or 210) has to be sitting empty at process vessel pressure with input valve 220 open and bottom valve 222 closed, while the other discharge lock hopper 210 (or 208) is filling. When discharge lock hopper 210 is full, diverter valve 224 directs process vessel discharge into discharge lock hopper 208. Input valve 226 on discharge lock hopper 210 is closed, the pressure in the discharge lock hopper 210 is lowered to atmospheric, the output valve 228 on discharge lock hopper 210 is opened, and upgraded charge is discharged to any necessary collection and conveying equipment via outlet duct 250. When empty, output valve 228 on discharge lock hopper 210 is closed, pressure inside the discharge lock hopper 210 is equalized with that of the process vessel 106, and input valve 226 is then opened. Discharge lock hopper 210 then sits empty and pressurized until companion discharge lock hopper 208 is full. The cycle then repeats.

Figure 3:
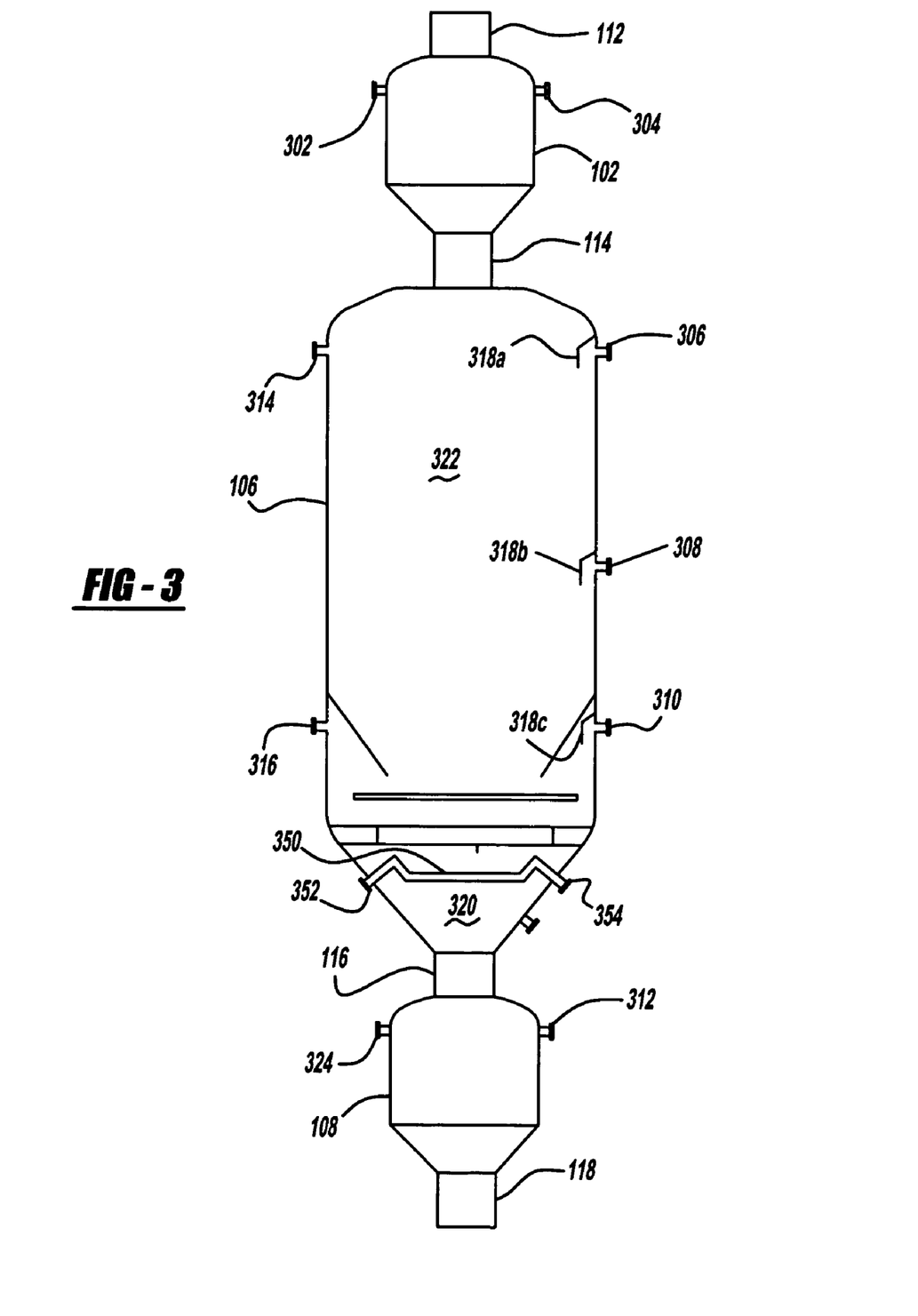
FIG. 3 is a partial cross-sectional view of the process vessel of FIG. 1 showing inlet and outlet nozzle arrangements in accordance with the principles of the invention.

FIG. 3 shows more detail for a single feed lock hopper operation in a semi-continuous system. Input and output valves 112 and 114 operate on feed lock hopper 102 as described above. A pressurization inlet 302 and depressurization outlet 304 are used to control the pressure in feed lock hopper 102. After feed lock hopper 102 has emptied its charge into process vessel 106, input valve 112 is still closed, output valve 114 is still closed, but feed lock hopper 102 is still at process vessel pressure and contains a saturated steam environment. A valve on the depressurization outlet 304 is opened, and the saturated steam vapor flows out of the feed lock hopper 102 until atmospheric pressure is achieved and the valve on the depressurization outlet 304 is closed. Input valve 112 on feed lock hopper 102 is then opened, and the lock hopper is filled with charge material. When full, input valve 112 is closed, and a valve on pressurization inlet 302 is opened. A suitable pressurization medium, such as saturated steam, super heated steam, air or another gas is used to raised the internal pressure to match that of process vessel 106, and the valve on pressurization inlet 302 is closed. Output valve 114 on feed lock hopper 102 is then opened, and material is fed into the process vessel 106.

Non-condensable gases are continuously vented from process vessel 106 using vents 306, 308 and 310 shown in FIG. 3. Non-condensable gas arises from volatile organics released from the carbonaceous charge material during upgrading, from air that enters the upgrading process absorbed in the feed charge material, and from any other gas introduced into the upgrading process. Non-condensable gas is normally present at minor concentrations in process vessel 106, with a majority volume constituent being saturated steam vapor. Thus, when non-condensable gases are vented, there is an accompanying steam flow that represents considerable energy loss from the upgrading process. Some of this energy can be recovered and reused by using all, or a portion, of process vessel vent flows as the pressurization gas for both feed lock hopper 102 and discharge lock hopper 108 operation. The pressurization outlets 304 and 312 on feed and discharge lock hoppers 102 and 108, respectively, vent gas that could be essentially almost pure saturated steam from the process. This also comprises energy loss. Using vent flows from process vessel 106 for lock hopper pressurization does not result in any additional energy loss from the upgrading process when vented a second time from lock hopper depressurization outlets 304 and 312.

With continued reference to FIG. 3, the heating medium is normally introduced into process vessel 106 through inlets 314 and 316 located on one side of process vessel 106, while process vessel vents 306, 308 and 310 are on an opposite side of the vessel 106. Both the inlets and vents can be at multiple elevational positions on the vessel and may involve many more locations than shown in FIG. 3. The vents are normally protected by associated diverter shields 318a, b, c which prohibit water and solids from escaping in the vent streams, but allow non-condensable gas and steam vapor to escape. One requirement of the inlet and vent placement is to prevent short circuiting of inlet flows directly to the vents. Another requirement of the inlet and vent placement is to create flow patterns across an interior volume of process vessel 106 in a substantially horizontal direction, a down-flowing direction, or an up-flowing direction to effectively control and remove non-condensable gases from process vessel 106. For instance, heavy non-condensable gases, such as carbon monoxide, will tend to migrate to the bottom interior portion 320 of process vessel 106, and they would not effectively be removed if all of the inlet and vent flow was at the top interior portion 322 of process vessel 106. In such a case, inlet and vent flows would be controlled to sweep the heavier non-condensable gas out of a lower vent location. In an opposite case, light non-condensable gas such as hydrogen will migrate to the top portion 322 of process vessel 106, and appropriate flow patterns between the inlet and vent locations need to be established to control concentration of light non-condensable gas in a top portion 322 of process vessel 106. In some instances, controlling both concentrations of heavy and light non-condensable gases is effectively implemented with substantially horizontal flow patterns between process vessel 106 inlets and vent locations.

In normal operation, the heating medium flow into process vessel 106 is controlled by pressure in process vessel 106. If the pressure drops below a desired operating set point, heating media inlet 314 flow will increase to compensate. Conversely, if the pressure rises above the desired operating set point, inlet flow will decrease. Vent flow out of process vessel 106 is normally controlled by measuring non-condensable gas concentration in process vessel 106 and then adjusting an appropriate control valve to achieve the desired mass flow of non-condensable gas (and accompanying water vapor) out of process vessel 106 at each desired vent location. Vent flow out of process vessel 106 can be a significant variable in terms of impacting heating medium inlet flow. Most of the heating medium inlet flow will be to provide sensible heat to heat the feed charge to operating conditions, provide energy for heat losses from the process, and provide energy for heat of reaction requirements that occur in the thermal upgrading process.

The preferred heating medium is either saturated steam or super heated steam introduced to the process vessel 106 through the upper and lower heating medium inlets 314 and 316, respectively, or through any other inlets located on an exterior wall of vessel 106. Likewise, the heating medium could be directed through internal piping into interior 322 of vessel 106 and used to provide energy to selected locations.

Compressed hot water may also be used as part of the heating media. For instance, when relatively cold incoming charge material is fed into the top of process vessel 106 through feed lock hopper 102, saturated steam will immediately start to condense and transfer energy into the cold charge thermodynamically by latent heat of condensation. The hot condensate, or compressed hot water, at this location or other locations within process vessel 106, will be hotter than the charge material and will also transfer heat into the charge material. If a suitable source of compressed hot water is available external to process vessel 106 at thermodynamic conditions capable of supplying heat into the thermal upgrading process, such compressed hot water could be introduced at multiple locations and used as the entire energy supply to the process. Alternatively, compressed hot water could be used as a partial supplement to saturated or super heated steam heating media. One benefit that comes from using saturated steam, or super heated steam after it has been de-super heated, is that saturated steam condenses isothermally, which means that steam will flow on its own to any location within process vessel 106 that is colder than the temperature of the saturated steam, provided that the porosity of the bed of charge material is sufficient to allow passage of the steam vapor to the cooler areas of the bed. Until it is de-super heated, super heated steam flow must be directed to its point of use.

It may be particularly advantageous to supply super heated steam to the thermal upgrading process through heating medium inlet 316 located near the bottom of process vessel 106 to serve at least two specific purposes. One would be to initially provide thermal energy to the charge material in a "dry" form through loss of heat from the super heated vapor or hot gas. This could be used to remove excess free surface moisture from the charge material and provide additional dewatering by converting free moisture to saturated steam. The use of "dry" super heated steam near the bottom of the process vessel would also provide a "dry" environment around the charge material and provide a differential in partial pressure between inherent moisture still contained in the charge material and the relatively dry vapor space at an outer surface of the charge material solid particles that would provide a thermal dynamic driving force for liberation of additional inherent moisture within the charge.

Pressurization of discharge lock hopper 108 through pressurization inlet 324, and depressurization through depressurization outlet 312 will be achieved and controlled in exactly the same manner as described above for feed lock hopper 102. As previously described, vent gas from vents 306, 308 and 310 may be used as the pressurization gas for discharge lock hopper 108.

During upgrading of the charge, the processing vessel uses temperatures ranging from a minimum temperature where the structure of the charge's particles become elastic and a maximum temperature where any substantial pyrolysis occurs. Preferably, the range is 400° F. to 500° F. with corresponding pressures of 247 psia to 680 psia, or pressures that substantially match the temperature at saturated steam conditions. Due to the presence of some amount of non-condensable gases that may be present in the vessel environment, the actual temperature at any given total process vessel pressure may be somewhat less than predicted by saturated steam conditions. For example, if total process vessel pressure is 500 psia and the concentration of non-condensable gases is 10% by volume, the partial pressure of the non-condensable gas will be 50 psia and the partial pressure of the saturated steam will be 450 psia. Hence the temperature of both the non-condensable gas and the saturated steam will be about 456° F. compared to a temperature of about 467° F. if only saturated steam were present.

In order for steam vapor to flow uniformly to colder regions of the process vessel bed for isothermally condensing and to also promote better draining and separation of moisture from the upgraded charge, it is desirable to use a properly sized carbonaceous feed material so that porosity is maintained in the bed. This is achieved by crushing and screening oversize material so that a maximum size of feed material is obtained. Likewise, some fines need to be removed from the feed material so that the fines do not pack into the void spaces between the larger particles and create regions of low bed porosity within the process vessel. It is recognized that because of mass to volume relationships, a given weight of fine material will have a much larger surface area than an equivalent weight of coarser material. Increasing the surface area of the charge material, also increases the area for free surface moisture to accumulate and makes dewatering of the upgraded charge more difficult. Particle size distributions for the feed material can range from 0.00 inch by minus 4 inch as an extreme, with plus 0.125 inch by minus 3 inch being more desirable, and with plus 0.25 inch by minus 2 inch being most desirable. In order for these size ranges to be effective, the feed charge material should be sized so that the distribution of sizes within the upper and lower size limits should closely follow the Rosin-Rammler index typically characteristic for the type of charge being upgraded.

Once in process vessel 106, the carbonaceous charge is heated to operating temperature and pressure. The average retention time of the charge in the process vessel 106 is determined by the volume of the process vessel 106, the bulk density of the charge material and the weight of the material fed. Retention times between about 5 minutes and about 1000 minutes are believed useful, with retention for about 15-60 minutes more preferable and about 20-30 minutes most preferable.

In a similar manner, the presence of super-heated steam can increase the temperature in the process vessel above that predicted by saturated steam conditions. Using the above example, if super-heated steam were present in the vessel with about 11° F. of super heat in the vapor, then the steam partial pressure would still be 450 psia, but the temperature of both the steam and the non-condensable gas would increase to 467° F., or the temperature of pure saturated steam at 500 psia.

Within the temperature and pressure ranges on a weight basis stated above, much more energy can be released from saturated steam when it condenses compared to energy released when super-heated steam cools down to saturated conditions or when compressed water left after condensation cools down and transfers heat. Hence, the use of saturated steam and the heat released when it isothermally condenses is the preferred approach of supplying heat to the process vessel.

As the charge reaches a desired temperature in the process vessel, the charge becomes more elastic allowing for the release of water with a minimum amount of charge particle fracturing.

Moisture present in the charge material is removed in accordance with the invention by several mechanisms.

The first mechanism for moisture removal is volumetric expansion of entrained water as the charge is heated up by the surrounding environment. The water thermally expands at a rate faster than the charge pore structure surrounding the water, and the water has no place to go except to exit the charge.

A second mechanism squeezes additional water out of the charge pores as the pores collapse in volume. The pores collapse in volume due to water being removed and due to the external pressure applied on the surface of the charge from the processing environment.

A third mechanism involves differential pressure between moisture and vapor form trapped in the charge which escapes to a region of lower pressure in the process vessel vapor phase.

A fourth, less desirable mechanism is removal of ionic and charge bonded water which is accomplished through thermal dynamic equilibrium shifts as the processing temperature increases. Removal of water from the charge via this mechanism is preferably minimized by limiting the maximum temperature in the processing environment. If only water were removed by the equilibrium shift, this would be acceptable. However, at the elevated temperatures, volatile organics contained in the carbonaceous charge are also released. As the processing temperature goes up, the amount of volatiles released starts to go up at an increased rate. The volatiles released from the charge either combine with the water in a soluble or entrained form or mix with the steam vapor as non-condensable gases. Neither process is desirable, as organics mixed into or soluble in the water add to the cost of water treatment prior to reuse and/or disposal of the water and increase the concentration of non-condensable gas in the process vessel vapor phase.

Indirect heating can also be utilized with the invention. As an example, heat exchange tubes 350 (FIG. 3) could optionally be placed anywhere in the process vessel where there would be contact between the charge material and the indirect heating surface of tube 350. As long as the indirect surface is at a higher temperature than the charge, there will be heat transferred into the charge. This may be particularly advantageous at a bottom of the process vessel as shown in FIG. 3 where an indirect heat surface serves to evaporate excess surface moisture from the charge prior to discharge. A source of indirect heating medium (not shown) would be coupled to element(s) 350 via ports 352 and 354.

High moisture content carbonaceous materials, such as sub-bituminous coal, contain up to 30% by weight inherent or entrained moisture. As mined, the inherent moisture content is very close to the equilibrium moisture content of the material, which is generally defined as that moisture level to which the coal will re-equilibrate if exposed to a new environment and then re-exposed to its original environment, unless the material has been either structurally and/or chemically altered when exposed to the new environment. As an example, coal mined from the seam at 30% moisture and allowed to air dry in a low humidity environment to, for example, 20% inherent moisture, will still have an equilibrium moisture value of about 30% and will eventually return or re-equilibrate to about 30% inherent moisture if exposed to a high humidity environment over time.

Most normal upgrading processes attempt to lower the inherent moisture level of the charge to a level much below the equilibrium moisture level reached during such processing. When shipped and stored, such material will attempt to equilibrate to its equilibrium moisture level by absorbing moisture from the environment. If this absorption occurs too rapidly, the charge may overheat and even undergo spontaneous combustion in storage or in transit.

It is believed that careful control of the processing conditions relative to the charge material that is to be upgraded in accordance with this invention will result in production of a thermally upgraded product that is stable and safe to ship as produced. However, with sub-bituminous charge material containing 20 to 30% inherent moisture, the resultant upgraded product in accordance with this invention will have an equilibrium moisture level between about 8 and about 16% by weight. Based on experience, coal with an inherent moisture level of about 7% cannot be safely shipped and stored as is, if the equilibrium moisture level is much higher, for example at 15%. Depending on the charge, if it is rehydrated back up to 10 to 14% inherent moisture it can be safely shipped and stored. Rehydration may be achieved in a controlled environment where moisture originally removed from the coal is added back to the coal or high moisture, non-upgraded or partially upgraded coal is blended with the low moisture upgraded charge.

Injection of air or other gas containing reactive oxygen into the process vessel is desirable for a number of reasons, each making use of desirable, highly exothermic reactions between oxygen and some form of fuel in the charge or process vessel. With oxygen injection, at least a portion of organic based volatiles expelled from the upgraded charge may be oxidized. Excess surface moisture can be burned off. Additionally, it is believed that unwanted byproducts such as mercury, can be more easily separated from the charge when subjected to oxidation reactions. Finally, selective oxidation of portions of an upgraded charge may render it more stable in storage.

One undesirable oxidation reaction is formation of excessive amounts of non-condensable gas that may have to be vented from the process vessel as discussed previously to control the impact of non-condensable gas on saturated steam temperature. Heat generated in any oxidation reaction approximately balances out energy loss due to venting the non-condensables and accompanying steam vapor. Conversely, if more non-condensable gas is desired in the process vessel, then air would be the preferred source of oxygen for the oxidation reaction, because of the high nitrogen (a non-condensable gas) content of the air and the fact that any oxidation reactions involving oxygen in the air form a non-condensable combustion product.

The purpose of adding air or other gas containing reactive oxygen is believed fulfilled when about 0.00005 pounds of reactive oxygen per pound of upgraded charge (dry basis) to about 0.05 pounds of reactive oxygen per pound of upgraded charge (dry basis) is added. About 0.00001 to about 0.025 pounds of added reactive oxygen per pound of upgraded charge (dry basis) is more preferable, with about 0.005-0.01 pounds of added reactive oxygen per pound of upgraded charge (dry basis) being most preferable.

Figure 4A:
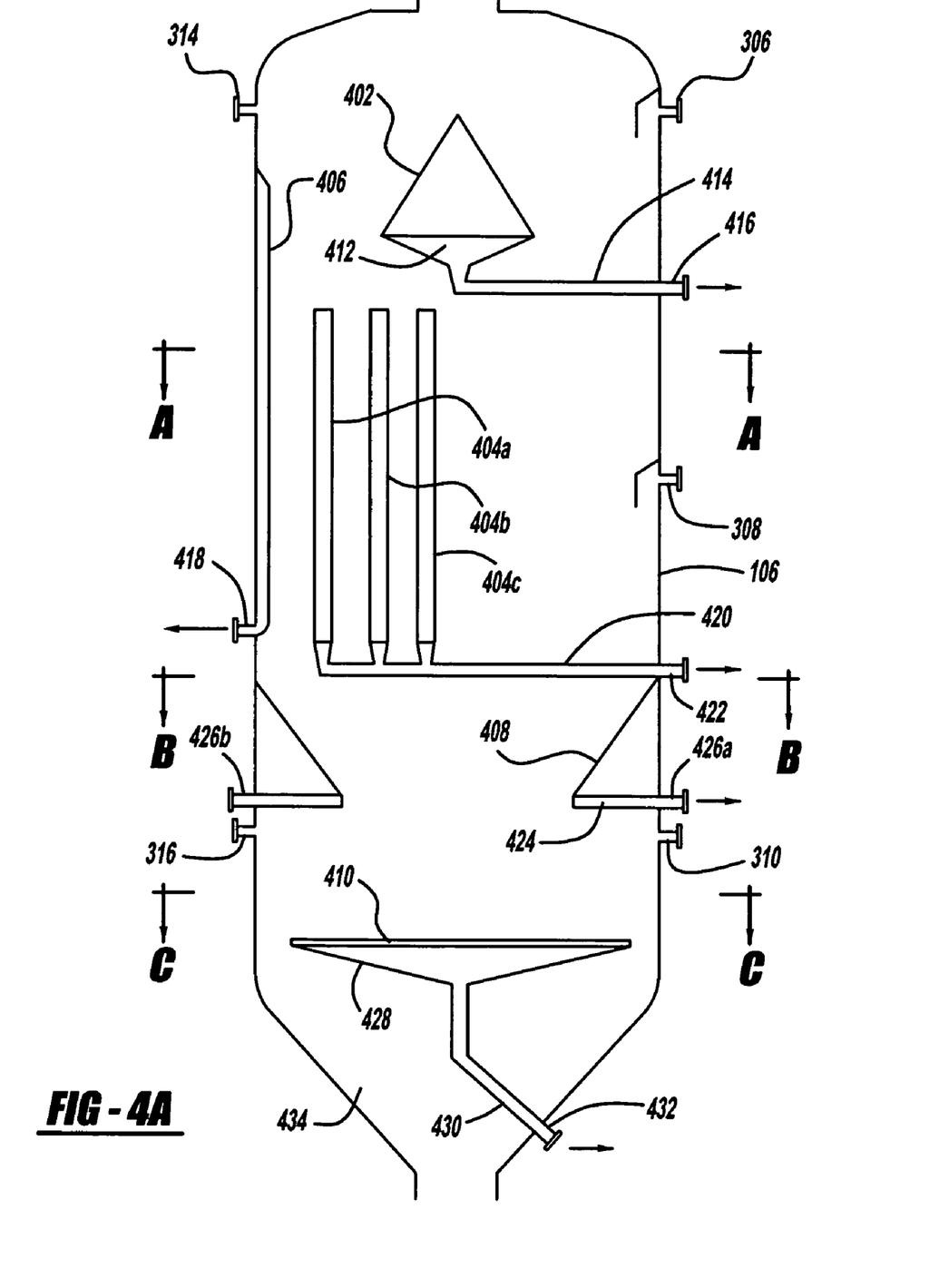
FIG. 4A is a cross-sectional view of the process vessel of FIG. 1 showing inlet and outlet nozzle details in addition to solid/water separation devices arranged in accordance with the principles of the invention.

FIG. 4A shows details of how the charge material within process vessel 106 is separated from water expelled therefrom. Both moisture eliminated from the charge material and steam condensate from the heating medium have to be continuously removed from vessel 106 as hot process water. This can be a difficult task, since both the charge material and the hot water tend to flow downwardly through the process vessel 106 due to gravity. Additionally, it is necessary to separate the two flows of the charge and the moisture, such that essentially dry upgraded charge material is removed from process vessel 106 in one stream, and hot water is removed in another totally separate stream or streams.

There are at least five different equipment arrangements usable for separating hot water from the charge material moving downwardly through process vessel 106. Examples are 1) outward sloping separation cone 402, 2) vertical perforated drainage tubes 404*a, b, c*, located in an interior volume of process vessel 106, 3) vertical perforated drainage tube 406 located on a wall of vessel 106, 4) inward sloping separation cone 408, and 5) at least one rotatable horizontal separation table 410.

These various separation units can be used in a variety of combinations with multiple placements within vessel 106 to effect the desired degree of water/solid separation. Furthermore, although the view of openings in the separation surface areas shows round holes 450 in FIG. 4B, these openings in the various separation areas alternatively could comprise slots, square openings, screens, grates, baskets, perforated tubes or any other device enabling hot water to pass through openings in the separation device while blocking flow of the solid charge. The size of the openings is selected to ensure good drainage while minimizing escape of fine solid materials. In addition, it is preferable to taper each opening so that the opening on the water collection side is slightly larger than the opening on the charge side. In this manner, solid particles which may become lodged in the openings have a better chance of being dislodged and passing through the opening.

Outward sloping separation cone 402 allows hot water to pass substantially downwardly through separation openings in the surface of cone 402, while the solid charge material is directed radially outwardly toward the wall of process vessel 106. Hot water passing through the openings in cone 402 is collected in a collection pan 412, or a header serving a similar function, and hot water exits process vessel 106 via an internal drain 414 which is coupled to hot water discharge 416.

Figures 4B, 4C, 4D, 4E:
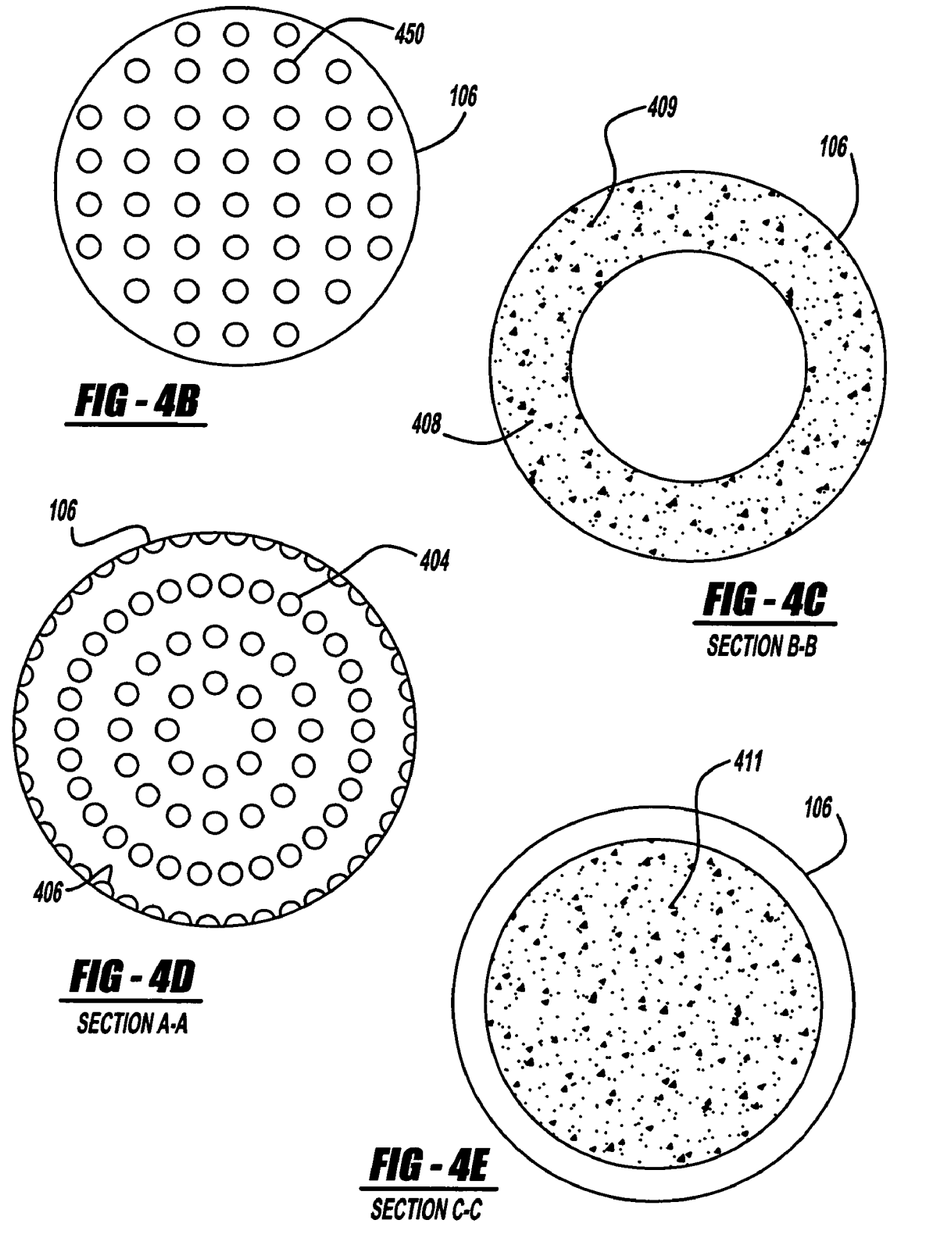

As solid charge material is directed radially outwards, the material flow can pass around and past internal drainage tubes such as 404*a, b, c* which allow hot water to separate from the solid charge through perforated holes in each tube. View A-A in FIG. 4D is a plan view looking down the interior volume of the process vessel 106 and shows that the internal drainage tubes 404 can be arranged in concentric circles which would provide multiple opportunities for hot water to be separated from the solid charge. Collection headers at a bottom of each tube collects the hot water and directs it to an internal drain 420 which then allows hot water to discharge from process vessel 106 through one or more hot water outlets 422.

Also shown in view A-A of FIG. 4D is an arrangement where the internal perforated tube 406 could be split in half and attached to a wall of process vessel 106 in a circular array in water tight manner such that hot water can be removed from the charge material immediately adjacent the vessel wall. Hot water collected in the tubes would be collected in a header at the bottom and passed out of the process vessel 106 as hot water to discharge 418. A portion or all of the perforated tube array could be replaced by a concentric wall with separation openings secured to process vessel 106's wall at the top in a water tight manner and with a collection header at the bottom to collect and pass the hot water to discharge through at least outlets 418 and 422.

Part of the function of outwardly sloping separation cone 402 is to direct solid flow radially outward. Part of the function of the inwardly sloping separation cone 408 is to direct solid flow radially inwardly, while providing an opportunity for hot water to separate from the solid charge material by flowing downwardly through openings in separation cone 408. View B-B of FIG. 4C looks downward on the inward sloping separation cone 408 in plan view and shows that the cone is concentric and attached to an outer wall of process vessel 106. The cone extends in an arc through the entire circumference of process vessel 106. Cone 408 could also be installed in segments and be discontinuous. Hot water passing through cone 408 openings 409 is collected in a concentric annular collection pan 424 which passes the hot water discharge through at least one or more outlets in process vessel 106. Two outlets, 426a and 426b, are shown in FIG. 4A as an example.

With continued reference to FIG. 4A, separation devices 402, 404a-c, 406 and 408 could be installed in multiple locations such that solid charge material flowing substantially downwardly in the process vessel 106 would alternate in a radially outward flow to a radially inward flow pattern to provide multiple opportunities for charge solids to pass over or around surfaces of the separation devices.

View C-C in FIG. 4E is a downward looking plan view depicting a substantially horizontal separation table 410 with perforated openings 411 allowing hot water to pass downwardly, be collected in a collection pan 428 and directed out of process vessel 106 through an internal drain 430 in fluid communication with water discharge outlet 432. Although separation table 410 is shown as a single table and as a complete circle in both plan and elevation views in FIGS. 4A and 4E, it would be possible to use multiple concentric tables of increasing diameter, each stacked underneath a smaller table above it such that solids would flow both downwardly and outwardly while cascading from one table to the next. Depending on placement and diameter of separation table or tables 410, solid charge material will flow off an outer edge of each table due to its angle of repose while the hot water will flow substantially downwardly through the table's perforations. Outward flow of charge solids can be substantially improved if separation table 410 is rotatable. This will effectively lower the angle of repose of material referenced to horizontal and improve outward flow of such material. It should also be possible to position stationary plows or similar structural members above rotating tables, such as 410, to improve the outward flow of solids and direct the solid charge material outwardly off an edge of the table or tables.

Although not specifically shown in FIG. 4A, it would be possible to place another inward sloping separation cone or concentric perforated wall inside and above the lower discharge conical portion 434 of process vessel 106 to separate additional hot water from charge material just prior to the charge material's exit from process vessel 106 into discharge lock hopper 108 (FIG. 3). It would also be possible to install any of the separation devices described above in discharge lock hopper 108 to provide additional opportunity for separation of hot water from upgraded charge material.

If the separation surfaces of the various separation devices of FIG. 4A were solid instead of perforated, such surfaces would form internal chambers or tubes within process vessel 106. If each such chamber had a separate inlet and outlet, then heating medium could be introduced into the inlets, thermal energy transferred through the chamber or tube via conduction, and thermal energy provided to process vessel 106 charge material in an indirect manner via the principles of conduction, convection and radiation heat transfer. Spent heating medium would then be conveyed out of the chambers or tubes through process vessel 106 to supplement direct forms of energy that are introduced through heating medium inlets 314 and 316 (FIG. 3).

As a converse to putting energy into the process vessel 106, energy could also be removed from process vessel 106 as just described by substituting a cooling medium for a heating medium.

Referring again to FIG. 4A, if air or other suitable oxygen-containing gas is introduced into the process vessel 106 for purposes of thermally oxidizing a portion of volatiles expelled from the charge, lowering required input energy, or for rendering the upgraded charge more stable in storage, it may be desired to premix the air or oxygen-containing gas with the heating medium prior to introduction into process vessel 106 through inlets 314 and 316. Although this may be the preferred approach, the air or oxygen-containing gas could also be introduced into process vessel 106 in any other inlet position. If premixed, the air or oxygen-containing gas would be substantially in an inert form and not capable of reacting with the heating medium while in the piping leading to, or in the heating medium inlets 314 and 316. Likewise, the air or oxygen-containing gas would be incapable of reacting with materials of construction in the piping and inlets. Once in process vessel 106, the air or other oxygen-containing gas would be free to expand, mix and react with various organic fuels present in the process vessel and serve its intended purpose. If the air or oxygen-containing gas were put into the process vessel through a dedicated inlet, without inert heating media being present, oxidation reactions could occur near to or within the inlet nozzle locations and damage the structural integrity thereof due to excessive overheating from localized, highly exothermic oxidation reactions with the various organic based fuels being upgraded.

Figure 5:
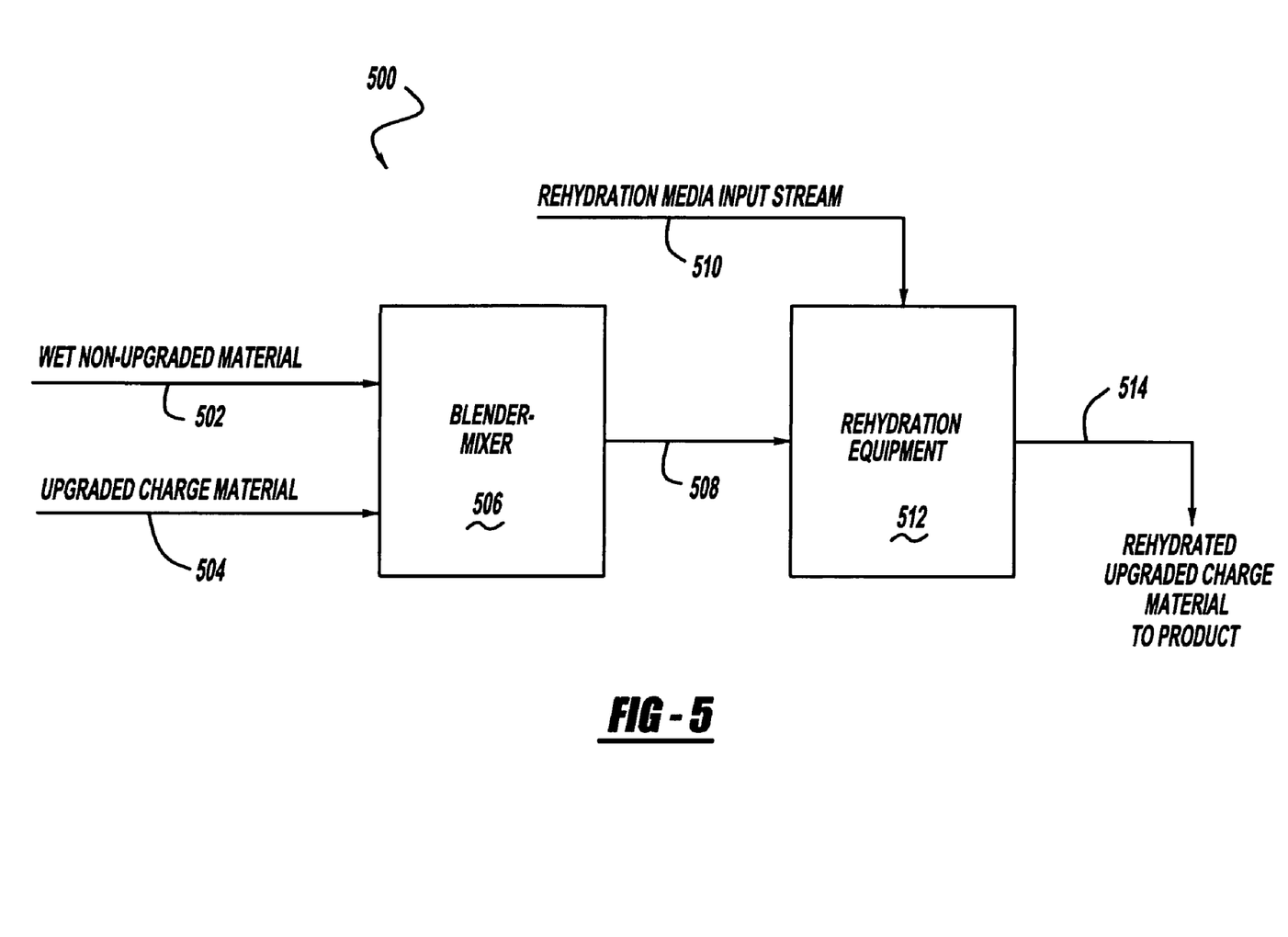
FIG. 5 is a schematic showing the orientation and placement of typical rehydration equipment and associated input, internal and output flow streams, arranged in accordance with the principles of the invention.

FIG. 5 is a schematic drawing showing a general equipment arrangement 500 with input, internal, and output stream details for alternative approaches to rehydrating the upgraded charge material exiting process vessel 106 prior to storage and shipment. Two equipment configurations can be used for rehydrating an upgraded charge in conduit 504. These are use of equipment to provide a blender-mixer function 506 or equipment for rehydration 512, or both. The arrangement in FIG. 5 shows the blender-mixer 506 preceding the rehydration equipment 512, but the arrangement could also be reversed. Upgraded charge material in conduit 504 as discharged from discharge lock hopper 108 of FIG. 3 may be unstable if the inherent moisture level in the material is excessively lower than the equilibrium moisture level of the material. If this is the case, rehydration moisture must be added back to the material to increase the inherent moisture level to a safe differential limit below that of the material equilibrium moisture level.

One method of rehydrating an upgraded charge is to add wet partial upgraded or non-upgraded charge material in conduit 502 to upgraded charge material in conduit 504, such that the blended mixture has a desired average inherent moisture content. The final blend must be fairly homogenous, so appropriate equipment is required such as a blender or mixer 506. The blend could also be made on a belt conveyor or other conveying device, if the blending was complete and uniform.

One of the materials that could be used as wet partially upgraded or non-upgraded charge material in conduit 502 is fines that exit process vessel 106 in the various hot water discharges. Another source of such material used in the blend could be feed charge material containing free surface moisture, particularly fines that are screened out of the carbonaceous material as described earlier to prepare a properly sized feed charge to process vessel 106.

If blending of solid charge materials to effect the desired degree of rehydration is not sufficient, then water can be added directly to upgraded charge material in the form of vapor or liquid water in a rehydration media input stream 510, for example via spray nozzles in equipment 512. The rehydration equipment 512 can be a moisturizing chamber, blender, mixer, or other device providing intimate and uniform contact between the rehydration media in 510 and the feed charge material to the rehydration equipment in conduit 508, such that the rehydrated upgraded charge material in conduit 514 contains the desired amount of inherent moisture.

EXAMPLES

For each of the following examples, the total moisture in feed coal and the inherent moisture in process coal are both measured by ASTM method D3302, while equilibrium moisture is measured by ASTM method D1412-93.

Example 1

Run-Of-Mine (ROM) sub-bituminous coal from the Black Thunder Mine near Wright, Wyo. was sized at minus 1½ inches by plus 16 mesh. The sized coal had a moisture content of 25.2 weight percent (w %), an equilibrium moisture content of 24.5% w % and a higher heating value (HHV) of 9010 Btu per pound. The coal was thermally upgraded in a batch-type autoclave of about 4 liter interior volume. The autoclave was a vertically oriented cylinder with about 1/16 inch mesh screen removable basket in the top section into which about 350 grams of feed coal is charged. The autoclave was sealed and saturated steam used to raise the pressure and corresponding saturated steam temperature to the targeted test condition. As the steam condensed, heat was released and the resultant condensate along with moisture released from the coal drained and collected in the bottom of the autoclave, beneath the coal basket. At the end of the targeted processing time, steam was vented out of the autoclave and the pressure lowered to ambient, at which time the basket containing the thermally upgraded coal was removed and the processed coal submitted for analysis. Out of many tests that were conducted, two serve to exhibit the impact of temperature on upgraded coal properties. One was at a saturated steam temperature of 430° F. and the other at 460° F., which corresponds to respective saturated steam pressures of about 344 pounds per square inch absolute (psia) and 467 psia. Gauge pressures at the elevation of the test facility are about 12.5 psi lower than the absolute pressures stated. The processing time from start of steam addition to start of venting was about 52 minutes for each test. When processed at 430° F., the upgraded coal had an inherent moisture level of 7.81 w %, an equilibrium moisture level of 16.1 w % and a HHV of 11,397 Btu/lb. When processed at the higher temperature of 460° F., the upgraded coal had a lower inherent moisture level of 6.0 w %, a lower equilibrium moisture level of 14.1 w %, and a HHV of 11,674 Btu/lb. These two tests demonstrate the beneficial impact of increasing the processing temperature (and pressure), particularly in terms of higher temperatures lowering the equilibrium moisture level in the upgraded product.

Note: factors other than inherent moisture impact the HHV, such as volatile content, ash content and sulfur content. Since different feed samples were used in these examples, the relationship between inherent moisture and HHV is not constant.

Example 2

The same type of feed coal used in Example 1 was tested at 17 minutes total processing time at a temperature of 460° F., and when analyzed the inherent moisture level in the processed coal was still very low at 6.3 w %, while the HHV was still relatively high at 11,598 Btu/lb, showing that processing times less than 20 minutes still yield very acceptable results comparable to processing times of 52 minutes. The effect of processing time was further demonstrated using another sample of coal with a starting inherent moisture level of 24.1 w %, which was processed at a temperature of 460° F. Processing times of 19, 32 and 52 minutes yielded respective inherent moisture levels in the upgraded product of 8.8 w %, 8.4 w % and 8.7 w %, and while the final inherent moisture levels were high as a group because of using a different sample of feed coal, there was basically no difference in final moisture level among the three tests that can be attributed to processing time, at least within the range of 19 to 52 minutes. Using a different batch autoclave apparatus capable of processing about 10 pounds of coal per batch, another sample of the Black Thunder coal similar to that described in Example No. 1 was processed at 467° F. at over a very long time period of 540 minutes. The inherent moisture level in the processed coal was 6.2 w %, showing that excessively long processing time does not impact the final moisture levels. Equilibrium moisture levels were not measured in the samples processed at shorter and longer time periods compared to the base cases at 52 minutes, but experience tells us that the equilibrium moisture levels are directly curvilinearly proportional to the inherent moisture levels.

Example 3

In two different tests with the same type of feed coal described in Example 1, feed coal containing about 0.085 microgram per gram (µg/g) concentration of mercury, expressed on a dry basis, was tested where air was added to one test and not to the other. With air addition, 72.1 w % of the mercury was removed from the processed coal and in the test without air addition, only 51.6 w % of the mercury was removed. This demonstrates that air addition during processing improves mercury removal. The air addition was made at the start of the test, before steam was added, and did not flow continually into the batch autoclave during the tests, but it is recognized that the air could have been added on a semi-continuous or continuous basis as long as the autoclave was vented to control the partial pressure of non-condensable gas within the autoclave as explained in the following discussion.

In these two tests, the temperatures were the same, but the pressures were different. When air is added to the process, it occupies part of the total pressure with steam vapor occupying the other part. For example, if the total pressure in the processing vessel is 466 psia and air occupies 20 percent of the volume (v %) and steam the other 80 v %, the partial pressure of steam is only 373 psia, which corresponds to a saturated steam temperature of about 437° F., not 460° F. that would be expected if the processing environment were 100 v % steam. As oxygen in the air is consumed during processing due to oxidation reactions, the reaction products equal the volume of oxygen consumed, so there is no change in temperature because of any change in steam partial pressure. The amount of air added during this particular test was about 0.06 weight fraction per one unit of feed coal, keeping in mind that the air was added on a batch basis at the beginning of the test. The same reasoning used to show the impact of air volume relative to steam volume on steam temperature can also be expanded to explain the impact of non-condensable gas volume or concentration, as the oxygen and nitrogen in air are both non-condensable gases, as are oxidation products such as carbon dioxide and carbon monoxide. Although carbon dioxide and carbon monoxide are both non-condensable, only the oxygen in carbon monoxide is reactive under the processing conditions practiced in this invention. Other volatiles released from the charge during processing can also be non-condensable gases such as methane, propane, hydrogen sulfide, sulfur dioxide and etc.

Example 4

In another set of two different tests with the same type of feed coal described in Example 1, air was added to one test on a continuous basis and was not added to the other test. As explained in Example 3, the process vessel was also vented on a continuous basis. Processing conditions were essentially equal in both tests with the same processing temperatures and times. When the liquid collected in the two tests resulting from moisture released from the coal, steam condensate, and soluble volatile organics was analyzed, the test with air addition had a lower concentration of Total Organic Carbon in the liquid, about 278 milligrams per liter (mg/l), than the test without air addition, or about 620 mg/l, indicating that oxygen in the air was reacting with the organics released from the coal either before, or while it was in contact with the water. This was also evident by less colorization in the water from soluble organics in the test where air was added. When organics are selectively oxidized while in the process vessel, the overall beneficial impact is to lower the cost of water treatment and clean-up. The amount of air added during this particular test was about 0.002 weight fraction per unit of unit of feed coal, keeping in mind that it was added continuously over the length of the test.

Example 5

Referring back to Example 1, there are thermocouples in both the upper and lower sections of the autoclave. Since steam condenses isothermally at the saturation temperature after the coal charge is heated up to processing temperature, one would expect both thermocouples to indicate the same temperature as the thermal upgrading process continues, but that is not the case. Based on volatile assay of the coal before and after processing, 1 w % to 5 w % of the coal feed weight is lost as volatiles, on a MAF basis (moisture and ash free). Of this amount, analysis of the non-condensable gas generated in the up-grading process based on tests without air addition, indicates that about 95 v % of the volatiles that are lost are carbon dioxide gas. In the autoclave tests, any non-condensable gas that is generated is not normally vented out of the process until the test is over. If the carbon dioxide non-condensable gas was mixed uniformly with the steam vapor, we would expect both thermocouples in the upper and lower portions of the autoclave to read the same temperature, but at a slightly lower temperature than would be predicted by the saturated steam pressure (see Example 3) if some non-condensable gas were present. In all autoclave tests where liquid is not removed from the bottom portion of the autoclave during the test, the bottom thermocouple initially indicates the same temperature as the top thermocouple, but as the test proceeds, the bottom thermocouple starts to drop in temperature and has reached at least 35° F. lower temperature than the top thermocouple. Based on volumetric measurements, it is known that when the lower thermocouple drops in temperature it is still located in vapor space and not immersed in liquid, but is just slightly above the liquid layer. During one test it was decided to drain liquid out of the bottom section before the test was over and immediately the bottom thermocouple reading increased to match the top thermocouple, and then started decreasing again until more liquid was drained. This observation and procedure has been repeated without fail a number of times, and with different processing equipment arrangements. It is now realized that high molecular weight gases, such as carbon monoxide with molecular weight (MW) 44 does not mix uniformly with steam water vapor with MW 18, but instead stratifies in a lower layer. When the carbon dioxide layer concentrated as the test progressed, the saturated steam temperature as measured by the thermocouple progressively lowered due to partial pressure decrease of the steam vapor concentration (see Example No. 3 for discussion on non-condensable gas affecting the saturated steam temperature) as carbon dioxide concentrated in a stratified layer just above the liquid interface. When the liquid interface was lowered due to removal of liquid, the carbon dioxide was not removed, but the layer level lowered and allowed the set position thermocouple to measure gas temperature that was substantially steam vapor rather than a mixed high concentration carbon dioxide and steam vapor concentration. Special procedures must be employed in the processing equipment to insure that high molecular weight non-condensable gases are effectively removed from the process vessel. By reasoning, the converse also holds true for non-condensable gases that are lower in molecular weight than steam vapor, such as hydrogen with MW 2.

Example 6

Coal was also thermally upgraded in a semi-continuously fed and discharged process vessel consisting of about a 6 inch interior diameter by 60 inch high cylindrical pressure vessel orientated vertically, equipped with a feed lock hopper and a discharge lock hopper with appropriate lock hopper valves. The unit is fed about 12 lbs of feed coal every 12-14 minutes which allows for a processing time of about 50 to 55 minutes. The process vessel is also discharged about every 12-14 minutes to maintain level control. Two tests point out the benefit of adequate draining and dewatering of the upgraded charge before discharge from the process vessel. Black Thunder ROM coal sized at minus 1 inch by plus 8 mesh was used as the feed coal with a moisture content of 25.8% and a HHV of 9076 Btu/lb. Saturated steam at 459° F. and 462.5 psia was used as the heating media. When liquid representing moisture removed from the coal plus steam condensate was continuously drained out of the bottom of the process vessel chamber and vented to atmosphere prior to transferring the upgraded charge to the discharge lock hopper, the inherent moisture level in the upgraded coal when discharged was 5.0 w % with a HHV of 11,554 Btu/lb. When liquid was not properly drained out of the bottom of the process vessel chamber, and the upgraded coal was allowed to be discharged with accompanying volumes of free liquid, the inherent moisture level in the upgraded charge was much higher at 12.6 w % with a HHV of 10,791 Btu/lb.

The invention has been described with reference to a detailed description only for the sake of example. The scope and spirit of the invention are to be derived from the appropriately interpreted appended claims.

What is claimed is:

1. Apparatus for upgrading energy content of a charge of carbonaceous material, the apparatus comprising:
 a process vessel having a chamber for receipt of the charge, a carbonaceous material inlet for transferring the charge to the chamber and a carbonaceous material outlet for transferring an upgraded charge out of the chamber;
 at least one heating medium inlet adapted to be coupled to a source of a heating medium for transferring the heating medium under pressure into the process vessel chamber for direct contact with the charge;

at least one fluid outlet of the process vessel; and at least one liquid separator positioned within the process vessel and having at least one perforated surface with liquid inlet perforations engaging the charge for passing liquid generated by processing the charge through the perforated surface into a liquid collection chamber coupled to the at least one fluid outlet for passing liquid separated from the charge thereto.

2. The apparatus of claim 1 wherein the heating medium comprises saturated steam.

3. The apparatus of claim 1 wherein the heating medium comprises superheated steam.

4. The apparatus of claim 1 further comprising a plurality of heating medium inlets positioned at a plurality of positions along a length of the vessel.

5. The apparatus of claim 1 further comprising a plurality of fluid outlets positioned at a plurality of positions along a length of the vessel.

6. The apparatus of claim 1 further comprising a plurality of liquid separators positioned at a plurality of locations within the chamber.

7. The apparatus of claim 1 further comprising:
at least one gas inlet to the process vessel chamber adapted to be coupled to a source of gas containing reactive oxygen.

8. The apparatus of claim 1 wherein the at least one heating medium inlet is further adapted to be coupled to a source of gas containing reactive oxygen.

9. The apparatus of claim 1 further comprising at least one process vessel vent enabling selective discharge of gases from the process vessel chamber.

10. The apparatus of claim 1 further comprising an indirect heat exchange element positioned at a preselected position within the process vessel chamber for indirectly heating at least a portion of the charge.

11. The apparatus of claim 1 further comprising a rehydration system coupled to the carbonaceous material outlet for receipt of upgraded charge and operative to add a preselected amount of moisture to the upgraded charge.

12. Apparatus for upgrading energy content of a charge of carbonaceous material, the apparatus comprising:
a substantially vertically oriented process vessel having a carbonaceous material inlet positioned at a top end of the vessel, a carbonaceous material outlet positioned at a bottom end of the vessel and a chamber for receipt of the charge extending from the carbonaceous material inlet to the carbonaceous material outlet;
a plurality of heating medium inlets adapted to be coupled to a source of a heating medium for transferring the heating medium under pressure into the process vessel chamber for direct contact with the charge, the heating medium inlets positioned at preselected locations between the top end and the bottom end of the vessel;
a plurality of liquid outlets of the process vessel positioned at preselected locations between the top end and the bottom end of the vessel;
a plurality of process vessel vents for enabling selective discharge of gases from the process vessel chamber and positioned at preselected locations between the top end and the bottom end of the vessel; and
a plurality of liquid separators positioned at a plurality of preselected locations within the chamber, each liquid separator having a perforated surface with liquid input perforations engaging the charge for passing liquid generated by processing the charge through the perforated surface into a liquid collection chamber coupled to at least one of the plurality of process vessel liquid outlets to pass separated liquid to the at least one of the plurality of process vessel liquid outlets.

13. The apparatus of claim 12 wherein the locations of the plurality of process vessel vents are preselected such that lighter-than-water vapor non-condensables generated in the process vessel chamber are removed from upper regions of the process vessel chamber and such that heavier-than-water vapor non-condensables generated in the process chamber are removed from lower regions of the process vessel.

14. The apparatus of claim 12 wherein the locations of the plurality of heating medium inlets are preselected such that charge material entering the carbonaceous material inlet is rapidly heated to a preselected vessel operating temperature and such that free moisture on surfaces of charge material about to enter the carbonaceous material outlet is converted to vapor form.

15. The apparatus of claim 12 wherein the locations of the plurality of process vessel vents are on opposite sides of and substantially at a same height as locations of corresponding heating medium inlets whereby efficient flow of the heating medium throughout the process vessel chamber is promoted.

16. The apparatus of claim 12 further comprising a plurality of gas inlets to the process vessel chamber adapted to be coupled to a source of gas containing reactive oxygen and positioned at a plurality of locations along the length of the vessel.

17. The apparatus of claim 12 wherein the plurality of locations of the gas inlets are in substantially same locations of the plurality of heating medium inlets.

18. The apparatus of claim 12 wherein the plurality of heating medium inlets are further adapted to be coupled to a source of gas containing reactive oxygen.

19. Apparatus for upgrading energy content of a charge of carbonaceous material, the apparatus comprising:
a process vessel having a chamber for receipt of the charge, a carbonaceous material inlet for transferring the charge to the chamber and a carbonaceous material outlet for transferring an upgraded charge out of the chamber;
at least one heating medium inlet adapted to be coupled to a source of a heating medium for transferring the heating medium under pressure into the process vessel chamber for direct contact with the charge;
at least one fluid outlet; and
at least one liquid separator having a liquid outlet coupled to the at least one fluid outlet and operative to separate the charge from liquid and to pass separated liquid to the at least one fluid outlet, wherein the at least one liquid separator comprises at least one perforated table positioned in the vessel to direct liquid through perforations in the table to a liquid storage area coupled to the liquid outlet and at least one plow to direct charge material radially outwardly toward a wall of the process vessel, one of the table and the plow relatively rotating with respect to the other.

20. Apparatus for upgrading energy content of a charge of carbonaceous material, the apparatus comprising:
a process vessel having a chamber for receipt of the charge, a carbonaceous material inlet for transferring the charge to the chamber and a carbonaceous material outlet for transferring an upgraded charge out of the chamber;
at least one heating medium inlet adapted to be coupled to a source of a heating medium for transferring the heating medium under pressure into the process vessel chamber for direct contact with the charge;
at least one fluid outlet of the process vessel; and
at least one hot water separator having a hot water outlet coupled to the at least one fluid outlet and operative to separate the charge from hot water generated by processing the charge and to pass separated hot water to the at least one fluid outlet,
wherein the at least one hot water separator comprises at least one rotating table positioned in the vessel to direct hot water through hot water input perforations in the table to a hot water storage area coupled to the hot water outlet and to direct charge material radially outwardly toward a wall of the process vessel.

21. Apparatus for upgrading energy content of a charge of carbonaceous material, the apparatus comprising:
a process vessel having a chamber for receipt of the charge, a carbonaceous material inlet for transferring the charge to the chamber and a carbonaceous material outlet for transferring an upgraded charge out of the chamber;
at least one heating medium inlet adapted to be coupled to a source of a heating medium for transferring the heating medium under pressure into the process vessel chamber for direct contact with the charge;
at least one fluid outlet of the process vessel; and
at least one hot water separator having a hot water outlet coupled to the at least one fluid outlet and operative to separate the charge from hot water and to pass separated hot water to the at least one fluid outlet,
wherein the at least one hot water separator comprises at least one perforated tube extending along at least a portion of the chamber between an inlet and an outlet end thereof to direct hot water generated by processing the charge through hot water input perforations in the tube, a hollow interior of the at least one tube coupled to a liquid storage area in turn coupled to the at least one fluid outlet.

22. Apparatus for upgrading energy content of a charge of carbonaceous material, the apparatus comprising:
a process vessel having a chamber for receipt of the charge, a carbonaceous material inlet for transferring the charge to the chamber and a carbonaceous material outlet for transferring an upgraded charge out of the chamber;
at least one heating medium inlet adapted to be coupled to a source of a heating medium for transferring the heating medium under pressure into the process vessel chamber for direct contact with the charge;
at least one fluid outlet of the process vessel; and
at least one hot water separator having a hot water outlet coupled to the at least one fluid outlet and operative to separate the charge from hot water generated by processing the charge and to pass separated hot water to the at least one fluid outlet,
wherein the at least one hot water separator comprises at least one perforated cone extending along a longitudinal axis of the chamber, having an apex pointing toward the carbonaceous material inlet and a base spaced from a chamber wall to direct hot water generated by processing the charge through hot water input perforations in the cone, a hollow interior of the at least one cone coupled to a hot water storage area in turn coupled to the at least one fluid outlet.

23. Apparatus for upgrading energy content of a charge of carbonaceous material, the apparatus comprising:
a process vessel having a chamber for receipt of the charge, a carbonaceous material inlet for transferring the charge to the chamber and a carbonaceous material outlet for transferring an upgraded charge out of the chamber;
at least one heating medium inlet adapted to be coupled to a source of a heating medium for transferring the heating medium under pressure into the process vessel chamber for direct contact with the charge;
at least one fluid outlet of the process vessel; and
at least one hot water separator having a hot water outlet coupled to the at least one fluid outlet and operative to separate the charge from hot water generated by processing the charge and to pass separated hot water to the at least one fluid outlet,
wherein the at least one hot water separator comprises at least one truncated cone having a perforated wall extending from a wall of the vessel toward the carbonaceous material output and terminating in an opening surrounding a longitudinal axis of the chamber to direct hot water generated by processing the charge through hot water input perforations in the wall of the truncated cone, and an annular liquid storage area positioned between the perforated wall and the vessel wall.

24. Apparatus for upgrading energy content of a charge of carbonaceous material, the apparatus comprising:
a process vessel having a chamber for receipt of the charge, a carbonaceous material inlet for transferring the charge to the chamber and a carbonaceous material outlet for transferring an upgraded charge out of the chamber;
at least one heating medium inlet adapted to be coupled to a source of a heating medium or transferring the heating medium under pressure into the process vessel chamber for direct contact with the charge;
at least one fluid outlet of the process vessel;
at least one hot water separator having a hot water outlet coupled to the at least one fluid outlet, a hot water inlet for receipt of hot water generated by processing the charge, the hot water separator operative to separate the charge from hot water and to pass separated hot water to the at least one fluid outlet,
at least one input lock hopper having an input adapted to receive carbonaceous material and an output coupled to the carbonaceous material inlet; and
at least one output lock hopper having an input coupled to the carbonaceous material outlet and an outlet for delivering upgraded carbonaceous material to a storage facility.

25. Apparatus for upgrading energy content of a charge of carbonaceous material, the apparatus comprising:
a substantially vertically oriented process vessel having a carbonaceous material inlet positioned at a top end of the vessel, a carbonaceous material outlet positioned at a bottom end of the vessel and a chamber for receipt of the charge extending from the carbonaceous material inlet to the carbonaceous material outlet;
a plurality of heating medium inlets adapted to be coupled to a source of a heating medium for transferring the heating medium under pressure into the process vessel chamber for direct contact with the charge, the heating medium inlets positioned at preselected locations between the top end and the bottom end of the vessel;
a plurality of liquid outlets of the process vessel positioned at preselected locations between the top end and the bottom end of the vessel;
a plurality of process vessel vents for enabling selective discharge of gases from the process vessel chamber and positioned at preselected locations between the top end and the bottom end of the vessel; and
a plurality of hot water separators positioned at a plurality of preselected locations within the chamber, each hot water separator having a hot water collection chamber coupled to at least one of the plurality of liquid outlets and operative to separate the charge from hot water and to pass separated hot water to the at least one of the plurality of liquid outlets, wherein the plurality of hot water separators comprises:

a first perforated conical surface positioned in an upper portion of the chamber and extending radially outwardly and downwardly to direct hot water generated by processing the charge through hot water input perforations in the conical surface, and a collection chamber beneath the first perforated conical surface in fluid communication with a first liquid outlet;

at least one hollow tube having a perforated surface extending downwardly in the chamber beneath the first perforated conical surface to direct hot water generated by processing the charge through hot water input perforations in the tube surface and having a lower end in fluid communication with a second liquid outlet; and a separation table having a perforated surface in a lower portion of the chamber beneath the at least one hollow tube to direct hot water generated by processing the charge through hot water input perforations in the table surface and having a collection chamber beneath the perforated surface in fluid communication with a third liquid outlet.

26. Apparatus for upgrading energy content of a charge of carbonaceous material, the apparatus comprising:

a substantially vertically oriented process vessel having a carbonaceous material inlet positioned at a top end of the vessel, a carbonaceous material outlet positioned at a bottom end of the vessel and a chamber for receipt of the charge extending from the carbonaceous material inlet to the carbonaceous material outlet;

a plurality of heating medium inlets adapted to be coupled to a source of a heating medium for transferring the heating medium under pressure into the process vessel chamber for direct contact with the charge, the heating medium inlets positioned at preselected locations between the top end and the bottom end of the vessel;

a plurality of liquid outlets of the process vessel positioned at preselected locations between the top end and the bottom end of the vessel;

a plurality of process vessel vents for enabling selective discharge of gases from the process vessel chamber and positioned at preselected locations between the top end and the bottom end of the vessel;

a plurality of hot water separators positioned at a plurality of preselected locations within the chamber, each hot water separator having a hot water collection chamber coupled to at least one of the plurality of liquid outlets, a hot water inlet for receipt of hot water generated by processing the charge, each hot water separator operative to separate the charge from hot water and to pass separated hot water to the at least one of the plurality of liquid outlets; and a rehydration system coupled to the carbonaceous material outlet for receipt of upgraded charge and operative to add a preselected amount of moisture to the upgraded charge.

* * * * *